UNITED STATES PATENT OFFICE.

DERRICK FRANK HAMLINK, OF WASHINGTON, DISTRICT OF COLUMBIA.

ANTI-NEURALGIC ELIXIR.

SPECIFICATION forming part of Letters Patent No. 366,093, dated July 5, 1887.

Application filed November 9, 1886. Serial No. 218,407. (No specimens.)

*To all whom it may concern:*

Be it known that I, DERRICK FRANK HAMLINK, a citizen of the United States, residing at Washington, in the District of Columbia, temporarily at Paris, in France, have invented a new and useful Composition of Matter to be Used for the Treatment of Neuralgia, of which the following is a specification.

*Formula.*—Liquid acetate of ammonia, say ninety grains; chloride of ammonium, say sixty grains; alcoholic tincture of belladonna, say ninety grains; alcoholic tincture of aconite, say ninety grains; alcoholic tincture of opium, say ninety grains; alcoholic tincture of gentian, say ninety grains; chloroform, say fifteen grains; calcined magnesia, say seventy-five grains; distilled water, two fluid ounces. These ingredients are to be thoroughly mixed by agitation.

One fluid ounce of the above concentrated preparation diluted in one pint of water constitutes the normal solution, of which the average dose for an adult is one tea-spoonful, taken three times per diem before meals.

What I claim, and desire to secure by Letters Patent of the United States, is—

The herein-described composition of matter to be used for the treatment of neuralgia, consisting of liquid acetate of ammonia, chloride of ammonium, alcoholic tincture of belladonna, alcoholic tincture of aconite, alcoholic tincture of opium, alcoholic tincture of gentian, chloroform, calcined magnesia, and water, in substantially the proportions specified.

DERRICK FRANK HAMLINK.

Witnesses:
M. F. MENNONS,
    *Patent Solicitor, Paris.*
F. MENNONS, Jr.,
    *Clerk to the above.*